United States Patent
Korolev et al.

(10) Patent No.: US 7,420,994 B2
(45) Date of Patent: Sep. 2, 2008

(54) PULSED CASCADED RAMAN LASER

(75) Inventors: Andrey Korolev, St. Petersburg (RU); Dmitri V. Kuksenkov, Painted Post, NY (US); Vladimir Nazarov, St. Petersburg (RU)

(73) Assignee: Corning Incorporated, Corning, NY (US)

( * ) Notice: Subject to any disclaimer, the term of this patent is extended or adjusted under 35 U.S.C. 154(b) by 415 days.

(21) Appl. No.: 11/073,264

(22) Filed: Mar. 4, 2005

(65) Prior Publication Data

US 2006/0198397 A1 Sep. 7, 2006

(51) Int. Cl.
*H01S 3/30* (2006.01)

(52) U.S. Cl. .......................................... 372/3
(58) Field of Classification Search .............. 372/3, 372/6
See application file for complete search history.

(56) References Cited

U.S. PATENT DOCUMENTS

| | | | |
|---|---|---|---|
| 5,323,404 A | 6/1994 | Grubb | 372/70 |
| 6,310,899 B1 | 10/2001 | Jacobovitz-Veselka et al. | 372/6 |
| 6,928,227 B2 * | 8/2005 | Shaw et al. | 385/141 |
| 2002/0149837 A1 * | 10/2002 | Sekimura | 359/333 |
| 2004/0213302 A1 | 10/2004 | Fermann et al. | 372/6 |
| 2005/0024716 A1 | 2/2005 | Nilsson et al. | 359/341.31 |

FOREIGN PATENT DOCUMENTS

WO WO96/37936 11/1996

OTHER PUBLICATIONS

"Germania-based fiber Raman lasers: recent results and prospects"; E. M. Dianov; ECOC 2004 Procceedings, vol. 3; Paper We1.3.1; p. 292-295.
"Tunable, broad visible range, fibre-based Raman source"; P. A. Champert et al.; Electronics Letters; Nov. 23, 2000; vol. 36; No. 24.
Efficient lasing of Cr2+: ZnSe at 2.2 μm pumped by all-fibre-format seeded Raman source; P.A. Champert et al; Electronics Letters; May 9, 2002; vol. 38, No. 10.
"Femtosecond soliton propagation in fibers with slowly decreasing dispersion"; S. Chernikov et al; 1991 Optical Society of America; vol. 8; No. 8/Aug. 1991; p. 1633-1641.
"A single-mode fiber with chromatic dispersion varying along the length"; Vladimir Bogatyrev et al; Journal of Lightwave Technology; vol. 9; No. 5, May 1991; p. 561-566.
"Soliton pulse compression in dispersion-decreasing fiber"; S. Chernikov et al; Optics Letters; vol. 18, No. 7; Apr. 1, 1993; p. 476-478.

(Continued)

*Primary Examiner*—Minsun Harvey
*Assistant Examiner*—Marcia A. Golub
(74) *Attorney, Agent, or Firm*—Svetlana Z. Short

(57) ABSTRACT

A pulsed cascaded Raman laser (10) includes a pulsed light source (102) for generating a pulsed light (104) having an optical spectrum centered at a source wavelength. A non-linear Raman conversion fiber (106) is coupled to the pulsed light source (102). The pulsed light (104) traverses the non-linear Raman conversion fiber (106) and the source power at the source wavelength is converted to a power output of an output signal (108) having an output wavelength longer than the source wavelength by a cascaded Stimulated Raman Scattering process, such that most of the source power is converted to the power of the last Stokes order in a single pass through the non-linear Raman conversion fiber (106).

13 Claims, 5 Drawing Sheets

OTHER PUBLICATIONS

"Optical Power Handling Capacity of Low Loss Optical Fibers as Determinded by Stimulated Raman and Brillouin Scattering", R. G. Smith, Nov. 1972, vol. 11, No. 11 Applied Optics, pp. 2489-2494.

"Large Raman gain and nonlinear phase shifts in high-purity $As_2Se_3$ chalocogenide fibers", R. E. Slusher, J. Opt. Soc. Am. B. vol. 21, No. 6, Jun. 2004, pp. 1146-1155.

"Generation of multiwatt, broadband continua in holey fibers", P. A. Champert, Optics Letters, vol. 27, No. 2, Jan. 15, 2002 pp. 122-124.

"Compact broadband continuum source based on microchip laser pumped microstructured fibre", L. Provino, et al Electronics Letters, Apr. 26, 2001, vol. 37, No. 9, pp. 558-560.

"Numberical optimisation of power conversion efficiency in 1480nm multi-Strokes Raman fibre lasers", G. Vareille, et al, Electronics Letters, Apr. 2, 1998, vol. 34, No. 7, pp. 675-676.

* cited by examiner

US 7,420,994 B2

PULSED CASCADED RAMAN LASER

BACKGROUND OF THE INVENTION

1. Field of the Invention

The present invention relates generally to Raman lasers, and particularly to pulsed cascaded Raman lasers operating at least in the mid-infrared (IR) wavelength range.

2. Technical Background

Coherent light sources in 1.8-2.0 µm wavelength range and beyond in the mid-IR (2-10 µm) find a number of important applications (such as medicine, life sciences, spectroscopy, and environmental sensing). Important applications also exist for even higher wavelength ranges past the end of the theoretical mid-IR wavelength of 10 µm. However, in contrast to the widely available light sources developed for the visible and near-IR spectral ranges, the choice of the longer wavelength light sources is very limited. InGaAsP/InP based semiconductor lasers, both edge-emitting and vertical-cavity surface emitting (VCSEL) lasers are limited to the operational wavelength shorter than 1.8 µm. InSb/InGaAsSb based and lead salt semiconductor lasers, as well as recently developed quantum cascade lasers, can operate in the mid-IR wavelength range but are limited to a very low output power and/or operation at cryogenic temperatures. Solid state and fiber lasers are limited to the available radiative transitions of the corresponding rare-earth ions (for example, 1.9-2.0 µm for Tm:ZBLAN and 2.9 µm for Er:YAG).

A recently developed technology of Raman wavelength shifting in optical fibers can in principle produce lasing or optical amplification at any wavelength where the glass material used to make the fiber is transparent. Multiple-order stimulated Raman scattering (SRS) generation, where the n-th Stokes component of the initial wavelength serves as a pump for generation of the (n+1)-th Stokes component is a known cascading wavelength converter for accomplishing a significant wavelength shift to a desired region within a transparency window of the glass material used to make the optical fiber, utilizing low cost initial laser sources.

However, the main drawback of known continuous wave (CW) Raman wavelength converters is the requirement to have a pair of high reflectivity mirrors (usually fiber Bragg gratings) defining a high quality optical cavity for each intermediate Stokes component, and associated decrease in a conversion efficiency with the increasing number of SRS cascades (Stokes orders). Practical application of this technology requires producing very high reflectivity (>99%) fiber gratings. Two gratings forming a high quality optical resonant cavity have to be employed for each intermediate conversion wavelength (Stokes order) and conversion efficiency is rapidly decreasing with the increasing number of conversion steps.

Although multiple hundred watt fiber lasers have recently become available, it might be difficult in practice to propagate that much power in a nonlinear fiber (with large enough Raman gain) and avoid stimulated Brillouin scattering in a backward direction.

Therefore, a need still exists to develop high power, efficient and tunable laser sources in the 1.8-10 µm range.

SUMMARY OF THE INVENTION

One aspect of the invention is a pulsed cascaded Raman laser including a pulsed light source generating a pulsed light having an optical spectrum centered at a source or pump wavelength $\lambda_p$. A non-linear Raman conversion fiber is coupled to the pulsed light source, wherein the pulsed light traverses the nonlinear Raman conversion fiber and the source power at the source wavelength $\lambda_p$ is converted to a power output centered at an output wavelength $\lambda_{out}$ longer than the source wavelength by a cascaded Stimulated Raman Scattering process, such that most of the source power is converted to the last Stokes order in a single pass through the non-linear Raman conversion fiber.

In another aspect, the present invention includes forming the nonlinear Raman conversion fiber from different fiber segments, wherein each fiber segment has a fiber segment length, and the fiber segment length is predetermined from the peak pulse power of the first Stokes order entering that segment and Raman gain, attenuation and effective area of the fiber segment such that the stimulated Raman scattering threshold is overcome for those Stokes orders that are generated and traverse that particular segment, and the last fiber segment length is just sufficient to overcome N-th Stokes order threshold but not sufficient to overcome (N+1) Stokes order threshold resulting in the source power converted mostly into the N-th order.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description present embodiments of the invention, and are intended to provide an overview or framework for understanding the nature and character of the invention as it is claimed. The accompanying drawings are included to provide a further understanding of the invention, and are incorporated into and constitute a part of this specification. The drawings illustrate various embodiments of the invention, and together with the description serve to explain the principles and operations of the invention.

DETAILED DESCRIPTION OF THE PREFERRED EMBODIMENTS

Figure 1:
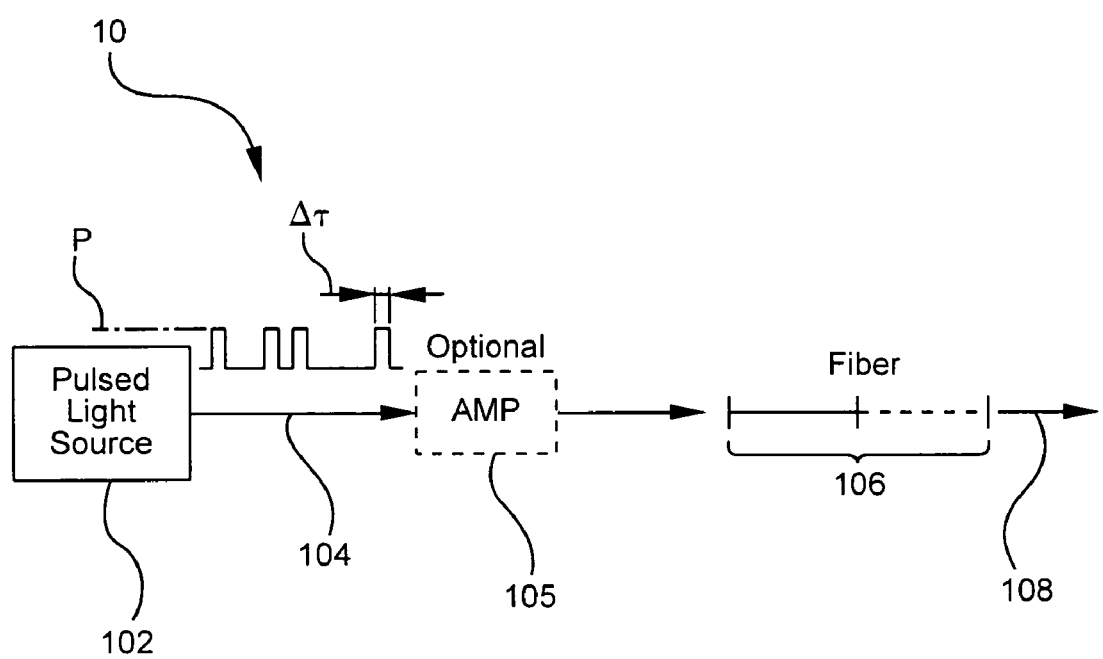
FIG. 1 is a block diagram view of the pulsed cascaded Raman laser 10 of the present invention.

A non-cavity or non-resonant method and apparatus for generating coherent light are taught herein. In accordance with the teachings of the present invention, cascaded stimulated Raman scattering (SRS) of pulsed pump radiation in an optical fiber with normal (negative) dispersion is used in the inventive method and apparatus to result in multiple order wavelength shifts of initially shorter wavelength towards longer wavelengths.

Reference will now be made in detail to the present preferred embodiments of the invention, examples of which are illustrated in the accompanying drawings. Whenever possible, the same reference numerals will be used throughout the drawings to refer to the same or like parts. One embodiment of the wavelength converter or Raman laser of the present invention is shown in FIG. 1, and is designated generally throughout by the reference numeral 10.

Referring to FIG. 1, a pulsed cascaded Raman laser 10 includes a pulsed light source 102 for generating a pulsed light 104 having an optical spectrum centered at a source wavelength $\lambda_p$. A non-linear Raman conversion fiber 106 is coupled to the pulsed light source 102. The pulsed light 104 traverses the nonlinear Raman conversion fiber 106 and the source power at the source wavelength is converted to an output signal 108 having an output power centered at an output wavelength $\lambda_{out}$ longer than the source wavelength by a cascaded Stimulated Raman Scattering process, such that most of the source power is converted to the last Stokes order in a single pass through the non-linear Raman conversion fiber 106.

As herein defined, most of the source power is converted to the power output of the last Stokes order means that the ratio of the output power at the output wavelength and the source power at the source wavelength multiplied by the output wavelength divided by the source wavelength is at least fifty percent.

As herein defined, the term "non-linear fiber" refers to an optical waveguide (including a fiber) having sufficiently large Raman gain, sufficiently long length, sufficiently low attenuation and sufficiently small effective area for the fundamental waveguide mode that the optical power threshold for generation of at least one (first) Stokes order does not exceed an optical damage threshold for the material the optical waveguide is made of.

From the cascaded Stimulated Raman Scattering or Raman wavelength conversion process, theoretically, any desired output wavelength, including those in the mid-IR range of 2-10 μm can be produced with Raman wavelength shifting in the appropriate optical fibers that can guide light at the source and also at the desired output wavelength where the glass material used to make the fiber is transparent. The fiber 106, made-up of one fiber or segments of different fibers, is formed from glass with the desired transparency range, Raman gain, and wavelength shift for a coversion to the desired wavelength range.

The output power of the laser 10 is limited only by the optical damage of the glass used to make the fiber and can in principle reach several hundred watts. As an example, while conversion to the wavelength up to approximately 1.9 μm can be performed in a silica based fiber, even without a pulsed light source, operating at longer wavelengths will necessitate using different glasses. An excellent choice for the mid-IR range (2-5 μm and beyond, to 10 μm) are chalcogenide glasses, which are not only transparent in that range, but also can have a Raman gain up to 1000 times larger than $SiO_2$. There are three types of chalcogenide glasses important for mid-IR range: sulfides—minimum attenuation in the wavelength range 2-6 μm; selenides—minimum attenuation in the range up to 8 μm; and tellurides—minimum attenuation possibly extends to 10 μm. Three types of oxide glasses that can potentially have transmission up to 5 μm are: germanates (based on $GeO_2$); aluminates (based on $Al_2O_3$) and tellurites (based on $TeO_2$, the preferred material of choice, different from tellurides).

Using pump pulses from the pulsed light source 102 with high peak power allows completing conversion in a relatively short length of fiber. The maximum theoretical power conversion efficiency is defined by the ratio of output to the pump photon energy, and therefore can approach 50% for the wavelength shift of the same order of magnitude as the pumping wavelength.

Optionally, a high-power optical amplifier is coupled between the pulsed light source 102 and the non-linear Raman conversion fiber 106 for amplifying the pulsed light 104 such that the peak pulse power of the pulsed light source 102 can be increased. Thus, cost-effective pump sources based on the well developed fiber amplifier technology for the amplifier 105 may be used as an increased pulse peak power pump source. The method and apparatus of the present invention are especially suitable for pump sources including Yb-doped (for generating output wavelength longer than ~1.1 μm) or Er-doped (for generating wavelengths longer than 1.6 μm) fiber optical amplifiers, but can also be used with other pump sources having other types of amplifiers 105, to form a master oscillator power amplifier (MOPA). For an output wavelength $\lambda_{out}$ greater than 2.0 μm, including those in the mid-IR range, 2-5 μm, a Thulium (Tm) optical fiber amplifier having Tm as the rare-earth dopant is preferred.

Due to a very long (several ms) lifetime of the excited states, rare-earth (for example, Er or Yb) doped fiber amplifiers essentially amplify the average power of the incoming signal, and for a very large duty cycle, an amplifier 105 with only a modest average power output can produce very large peak pulse power. For example, seed pulses from a directly modulated distributed feedback (DFB) laser diode; or produced by a semiconductor or other CW laser coupled to an optical modulator for forming pulses and setting the pulse width can be amplified to a peak power of 20 kW in a multiple-stage Er-doped amplifier 105, while the average output power of the last stage is only 2 W.

With such a large peak power, conversion to the $10^{th}$ Stokes order could be performed in only 20 m length of silica-based fiber. Other types of optical amplifiers and seed pulse sources, such as Q-switched solid-state lasers and solid-state amplifiers doped with various rare-earth ions can be used as the amplified pulsed light source 102 and 105.

Directly modulating a semiconductor laser diode with an electrical pulse generator, for setting the pulse width, can also be the pulsed light source 102 for generating the pulsed light 104, with or without further amplification. For maximizing the conversion efficiency, a rectangular pulse is preferred, since for other than rectangular pulse shapes, power in the wings of the pulse will not be sufficient for conversion to the last output Stokes order (N) and will effectively be lost.

Since Er, Yb and Tm-doped amplifiers have a relatively wide spectral gain bandwidth (several 10s of nanometers), the whole system can be easily made wavelength tunable by using a tunable seed pulse source (such as an external cavity semiconductor laser, directly modulated or coupled to a separate modulator). In certain cases, it might also be useful to be able to position the initial pump wavelength of the pulsed light 104 in such a way that none of the intermediate Stokes orders coincide with the strong absorption (loss) peaks of the conversion fiber 106, for example water absorption peaks, to avoid decreasing conversion efficiency.

Aside from pulse peak power, the pulse width is another variable of the pulsed light source 102 that is taught to be controlled for the efficiency of the present invention. However, both pulse width and power can be fixed parameters of the pulsed light source 102 and need not always be variable.

If an arbitrary waveform modulation of the average power of the cascaded Raman laser of the proposed invention is desired, as seen in the pulsed light 104 waveform sketch of FIG. 1, the non-periodic pulsed light 104 can still be used to generate the Stokes orders, where the pulses are not following one another with the same time interval. To generate such a non-periodic pulsed light 104, the duty cycle (the ratio of pulse width to the pulse repetition period) of a source laser is varied according to the specified waveform. As a result, the peak power of each individual pulse, and, therefore, the peak power of the output, the wavelength-converted pulses, is the same, but the average power of the output is changing in the direct proportion to the duty cycle. In general, the duty cycle can be anything between 0 and 1, or single pulse to quasi-CW light, and is dictated by the peak pump power requirements for a particular system.

For better understanding of the teachings of the present invention, it is useful to consider the principle of operation of the proposed device in greater detail. As the pulsed pump light 104 propagates in the nonlinear Raman conversion fiber 106, the i-th Stokes order of the source wavelength of the pulsed light 104 serves as a pump for generation of (i+1)-th Stokes order, up to the last order N, in a cascading wavelength conversion process for accomplishing a significant wavelength shift to a desired region within a transparency window of the glass material used to make the optical fiber, utilizing low cost initial laser sources. The main advantage of the pulsed cascaded Raman laser is the flexibility of the output wavelength choice. Depending on the pump wavelength and the number of SRS shifts, almost any output wavelength within a transparency range of the fiber used to make the shifter can be generated.

Figure 2:
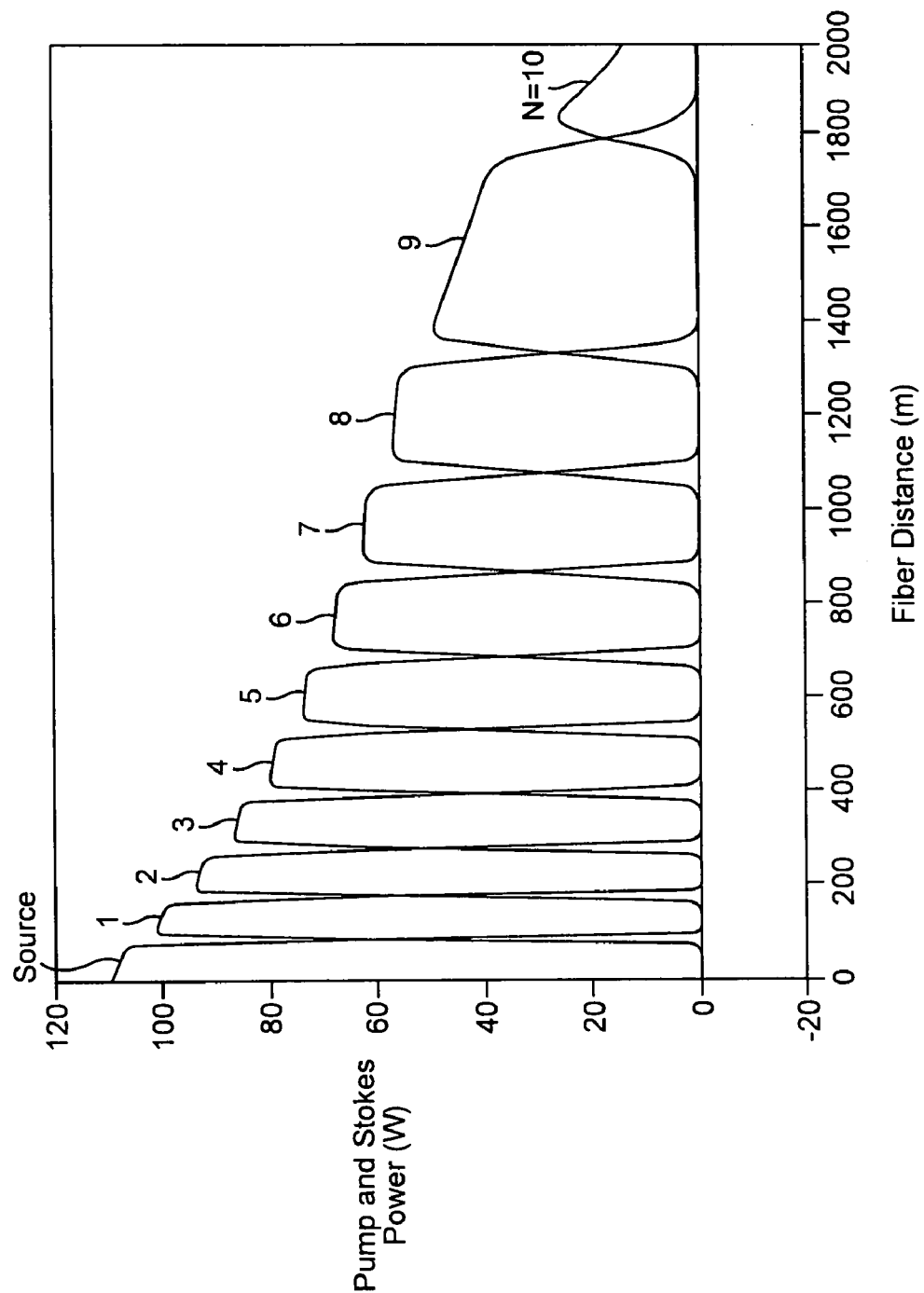
FIG. 2 is a plot of optical power versus fiber length, for pump light, 9 intermediate Stokes orders and output light produced by numerical modeling, in accordance with some aspects of the present invention.

In the simplified numerical modeling example of FIG. 2, a 110 W of continuous wave (CW) pump power at a source wavelength of 1.06 µm, instead of the preferred pulsed light source 102, is directly provided to a nonlinear Raman conversion fiber. The continuous wave input source was used to simplify modeling and the resulting behavior is expected to be equivalent to the case when the pulse width is long enough so that effects of dispersion-related pulse walk-off can be neglected. Another assumption in the model is that seed power of $10^{-9}$ W for each Stokes component is present at the fiber input end, which is expected to be approximately equivalent to the amount of seed power provided by spontaneous Raman scattering process in a real device. As shown by the plot of power versus fiber length in FIG. 2, the power is fully converted to the i-th Stokes order before the next conversion step to the (i+1) order starts. This might not be the case in the real device where dispersion related pulse walk-off effects are always present. The plots of FIG. 2 also show that 100-200 m fiber length is required for each conversion step and all power is converted into the $10^{th}$ Stokes order (an output wavelength of ~2.0 µm for the source wavelength of 1.06 µm for N=10) at the fiber output 108. For the numerical modeling of FIG. 2, a fiber effective area (area of the mode, roughly the same as cross-sectional area of the core) of 15 µm$^2$ and a typical Raman gain of GeO$_2$-doped silica (~1.5× $10^{-13}$ m/W) were assumed, which represents typical state of the art silica-based nonlinear Raman conversion fiber, such as the one that would most likely be used for cascaded resonant Raman lasers of the prior art.

Furthermore, as illustrated by the numerical modeling results of FIG. 2, the self phase-matched nature of the Stimulated Raman Scattering (SRS) process, ensures that, given sufficient pump power to overcome the Raman threshold and enough fiber length, all or nearly all of the pump power will be converted to the last Stokes order, in one pass. It is that property of a nearly complete conversion in one pass that is the basis of the present invention. Because SRS is a self-phase matched process, it takes place in all fibers and its efficiency is largely unaffected by the variations in fiber dispersion, attenuation or effective area. Thus, the operation of the pulsed cascaded Raman laser is advantageously robust to variations in dispersion, loss and effective area of the fiber used.

Since the output light is generated in a single pass, high reflectivity Bragg gratings are not required. Laser cavities or wavelength selective reflectors are not necessary at all, not for the pump wavelength, not for any intermediate Stokes wavelength, and not for the output wavelength, thereby reducing cost and complexity.

The pulsed cascaded Raman laser is essentially a segment of optical fiber or several segments spliced together, so that no complicated assembly is required.

As another advantage, pulsed operation prevents any problems associated with stimulated Brilloum scattering (SBS). For optimum SBS suppression, it is preferable that pulses are no longer than 50 ns. There is two ways to suppress SBS—to broaden the linewidth of the pulsed light source 102 or to shorten the effective SBS interaction length in the nonlinear Raman conversion fiber 106. However, these two methods are related because broadening the linewidth decreases the coherence length of the source which is related to effective SBS interaction length. Using pulses achieves both. The shorter the pulse, the broader the linewidth. Due to an uncertainty principle, the linewidth is at least as broad as the inverse of a pulse width. But also, the shorter the pulse in time, the shorter is its length in space. Hence, a pulse width of 50 ns translates to only 15 m of fiber (assuming refractive index of 1.5), which is a very short length that effectively suppresses the SBS. A value of 50 ns mentioned here is intended to serve only as a general guideline. Depending on fiber design and the amount of pump (and output) power desired, longer pulses might work fine, or even shorter ones than 50 ns might be needed.

It is very important for the understanding of the present invention to discuss requirements for the chromatic dispersion of the nonlinear Raman conversion fiber 106. The main requirement for the operation of the pulsed cascaded Raman laser is that the conversion fiber has normal (negative) dispersion at any point along its length, at least for the wavelengths of those source, output and intermediate Stokes orders that are traversing this point. Normal (negative) dispersion is needed to prevent nonlinear optical effects detrimental to the cascaded Raman laser efficiency, such as pulse break-up caused by soliton effects, spectral line broadening caused by four-wave mixing, amplification of noise and spontaneous emission by a parametric or modulational instability effect and generation of "parasitic" spectral lines.

Known techniques of fiber waveguide design can be used to ensure that the fiber dispersion is normal (negative). Standard doped or micro-structured fiber, where the cladding contains a number of holes running along the fiber length, can be used. Such micro-structured fiber might have an added advantage of a very small effective core area increasing the SRS gain and conversion efficiency.

For the case when conversion to a very different wavelength (through many Stokes orders) is desired, it might be difficult to design a single fiber that has the required dispersion properties over such a large wavelength range. In this case, several segments of different design fibers can be concatenated. An added advantage for segmenting the fiber is that not only each segment can be designed to have different dispersion, but also each segment can be separately optimized for generation of only those Stokes orders that will go through the conversion in this particular segment. It is even possible to concatenate fibers made of different glass with different transparency ranges, Raman gain, and wavelength shift.

It is difficult to define the minimum absolute value of fiber dispersion that is still sufficient for suppression of detrimental nonlinear effects discussed above, since it depends on many factors including the rise and fall times of the pump pulses. In modern optical communication systems, it is usually believed that about 2-3 ps/nm/km of dispersion is enough to suppress four-wave mixing. However, the power levels used in optical transmission are usually much less than those discussed here. Therefore, the present invention teaches that it is preferable if the fiber dispersion is more negative than −10 ps/nm/km.

Another important effect to discuss which is related to dispersion is a pulse walk-off. The walk-off phenomenon is a known result of a non-zero chromatic dispersion of the non-linear Raman conversion fiber 106. Two Stokes orders undergoing conversion have different wavelengths and therefore respective pulses of light travel in fiber with different speed, eventually overlapping for only a part of the full pulse width, resulting in incomplete conversion.

Those skilled in the art would understand how walk-off and pulse width and dispersion and Raman shift are inter-related. If E is the amount of pulse walk-off (in % of the total pulse width) that can be allowed, then absolute value of the local fiber dispersion D (at the point where a specific Stokes order $\lambda_i$ propagates) has to satisfy:

$$|D(\lambda_i)| < \frac{\varepsilon \Delta \tau}{\Delta \lambda_i L_c}; \text{ or } |D(\lambda_i)| < \frac{c \varepsilon \Delta \tau}{\Delta v_i \lambda_i^2 L_c} \quad (1)$$

where $\Delta\tau$ is the pulse width, c is the speed of light, $\Delta\lambda_i$ and $\Delta v_i$ is the magnitude of the i-th Stokes shift in wavelength and frequency, correspondingly and $L_c$ is the length of fiber required for i-th conversion step. Therefore, for a given value of Stokes shift, inequality (1) connects the pulse width and fiber dispersion. Whether one first chooses the pulse width and then the dispersion or dispersion first and then the pulse width will really be determined separately for each real-life design.

Considering the example of Ge-doped silica fiber used to generate FIG. 2, for the peak pulse power of approximately 100 W, the conversion length for the first few Stokes orders is approximately 100 m, as seen in FIG. 2. Assuming the pulse width of 10 ns, it follows from (1) that the fiber dispersion can not be more negative than −100 ps/nm/km.

Based on the above, the present invention teaches that the nonlinear Raman conversion fiber dispersion is preferred to be normal (negative), but its absolute value is a trade-off. Dispersion needs to be high enough to suppress detrimental nonlinear effects but not too large to avoid pulse walk-off. For the example of a Ge-doped silica fiber used to generate FIG. 2, and assuming 10 ns pulse width, according to the teachings of the present invention, it is determined that fiber dispersion D has to satisfy −100 ps/nm/km<D<−10 ps/nm/km.

The control of the pulsed cascaded Raman laser 10 is provided by the choice of the conversion fiber parameters and length depending on the available pump pulse width and power, as well as the number of intermediate Stokes orders. The non-linear Raman conversion fiber 106 is first provided to have a uniform chromatic dispersion throughout its length, such that the chromatic dispersion is normal (has a negative value) for the source wavelength, the output wavelength and every wavelength of an intermediate Stokes order. The value of the chromatic dispersion at each of the source, output and intermediate Stokes wavelength is determined by a trade-off between the requirement to minimize detrimental nonlinear effects and by the requirement to minimize pulse walk-off for any two consecutive conversion orders (wavelengths). The non-linear Raman conversion fiber 106, having the entire length as the fiber length or segments for individual fiber segment length, is cut for the optimal length as determined from the peak pulse power of the pulsed light source 102 and the Raman gain, attenuation and effective area of the fiber or its segments 106, such that the stimulated Raman scattering threshold is overcome for N consecutive Stokes orders but is not overcome for (N+1) order resulting in source power converted mostly into the N-th order or last order. if the fiber 106 is provided as a serial connection of nonlinear fiber segments, each fiber segment is cut or chosen to have a normal (negative value) chromatic dispersion for a particular subset of the input, output, and intermediate Stokes orders (wavelengths) that are traversing the particular fiber segment. The value of the chromatic dispersion at each of the wavelengths of the subset is determined by the trade-off between the requirement to minimize detrimental nonlinear effects and the requirement to minimize pulse walk-off for any two consecutive conversion orders (wavelengths). Hence, each fiber segment has a fiber segment length, and the fiber segment length is predetermined from the peak pulse power of the first Stokes order entering that segment and the Raman gain, attenuation and effective area of the fiber segment 106 such that the stimulated Raman scattering threshold is overcome for those Stokes orders that are generated and traverse that particular segment, and the last fiber segment length is just sufficient to overcome N-th Stokes threshold but not sufficient to overcome (N+1) Stokes threshold resulting in source power converted mostly into N-th order.

The present invention teaches that the pump power threshold for generation of the n-th order Raman component can be estimated using the expression for threshold power for the first order component derived by Smith. [R. G. Smith, Appl. Opt., 1972, v. 11, n. 11, p. 2489, references to the Smith's paper can also be found in articles by P. A. Champert, S. V. Popov, and J. R. Taylor, Opt. Lett., 2002, v. 27, p. 122, and R. E. Slusher, G. Lenz, J. Hodelin, J. Sanghera, L. B. Shaw, and I. D. Aggarwal, "Large Raman gain and nonlinear phase shifts in high-purity $As_2Se_3$ chalcogenide fibers" JOSA B, V. 21, No. 6, p. 1146, 2004] Smith's expression can be generalized in the following way to accommodate the teachings of the present invention:

$$P_{th}^{pump} \approx \frac{16 A_{eff} k_{eff}}{g_0 L} \quad (2)$$

Where $\lambda_{eff}$ is the effective mode area of the fiber, L is the fiber length, and $g_0$ is the Raman gain coefficient at the pumping wavelength. A coefficient $k_{eff}$ is given by:

$$k_{eff} = 1 + \sum_{1}^{n-1} \frac{\lambda_i^2}{\lambda_p^2} \quad (3)$$

where $\lambda_p$ is the pump wavelength. By multiplying the threshold expression by $k_{eff}$ generation of the multiple Raman orders is taken into account, along with the decrease of the Raman gain coefficient with wavelength and photon energy difference. Expression (1) can also be extended to take into account non-zero fiber loss at different wavelengths. The inventors of the present invention observed a satisfactory agreement between predictions of formula (2) and experimental results on generation of the $10^{th}$ Stokes order of a 1.06 µm (approximately 2.0 µm) source in a nonlinear Ge-doped silica fiber.

Figure 3:
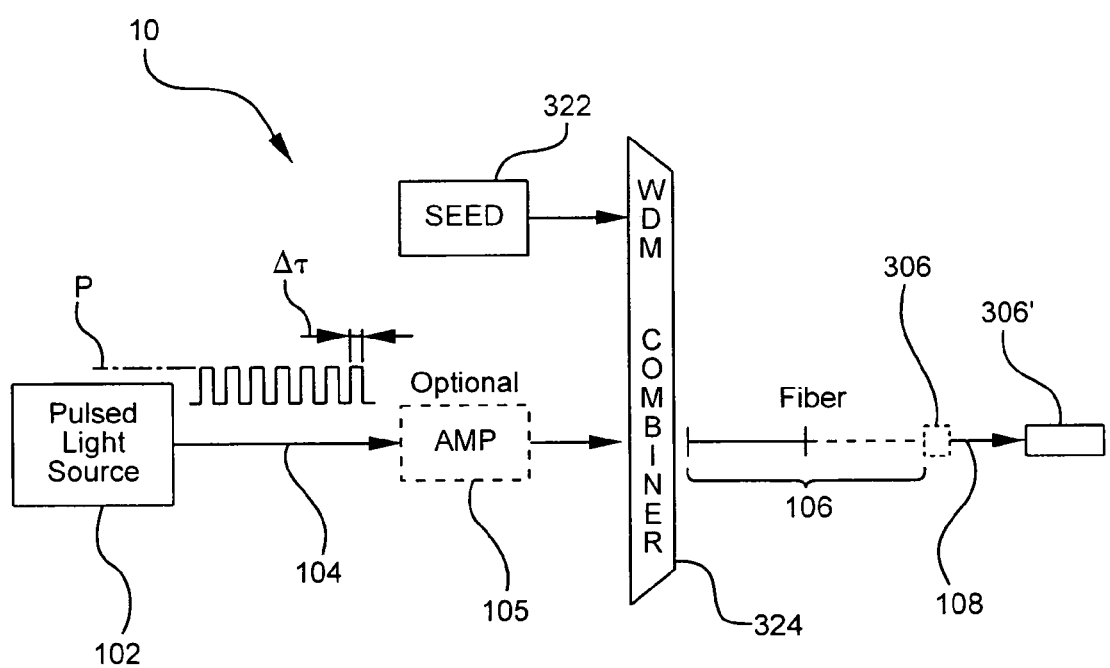
FIG. 3 is a block diagram view of the pulsed cascaded Raman laser 10 of FIG. 1, with additional features shown, in accordance with the present invention.

Referring to FIG. 3, a variation of the pulsed cascaded Raman laser 10 of FIG. 1 is represented. As an end section 306 of the Raman conversion fiber 106 or an additional end section 306' coupled to the end of the Raman conversion fiber 106, the end section 306 or 306' provides a spectrum shaper. As defined herein, the spectrum shaper is any optical device, including any optical mechanism that can change the shape of an output spectrum. The spectrum shaper shapes the desired output spectra for particular desired applications. For example, the spectrum shaper can broaden the spectrum past a particular wavelength.

As the end section 306' for broadening the spectrum past a particular wavelength, a separate supercontinuum generating fiber can provide a supercontinuum output spectrum, when the supercontinuum generating fiber has a dispersion zero at or near the output wavelength of the laser 10. On the other hand, the end section 306 of the nonlinear Raman conversion fiber 106 can itself serve as the spectrum shaper, have a dispersion zero at or near the output wavelength, such that the portion 306 of the fiber length at the very end serves as a supercontinuum generating fiber.

Successful Raman conversion in an anomalous (positive) dispersion fiber (or even one with normal and very small dispersion) is impossible because of the spectral broadening and ultimately supercontinuum generation caused by four-wave mixing. However, this property can be useful if such a fiber or fiber section is serving as a supercontinuum generating fiber.

Figure 4:
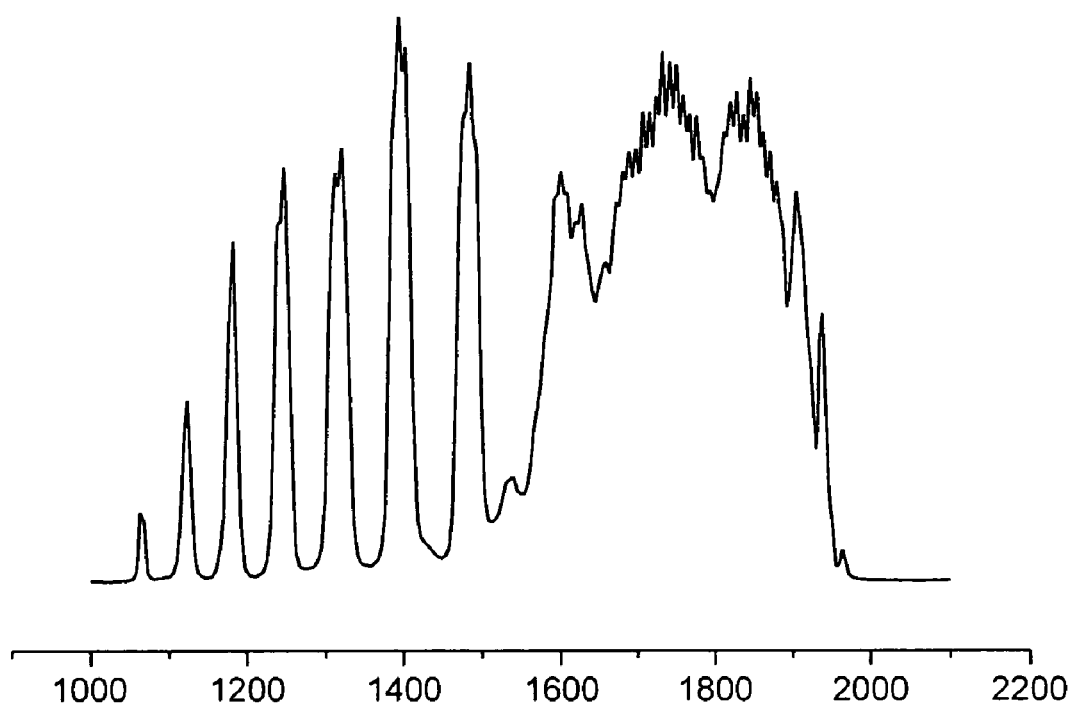
FIG. 4 is a spectrum graph of the output of the pulsed cascaded Raman laser 10 of FIG. 3, where the spectrum shaper 306 or 306' is a supercontinuum generating fiber, in accordance with the present invention.

Referring to FIG. 4, the experimental results of pumping a 4 km long LEAF® fiber with zero dispersion at 1.51 µm with 13 nJ pulses at 1.06 µm are shown to contrast the supercontinuum spectra versus the Raman conversion comb. The successive Raman generation proceeds normally up to the $6^{th}$ Stokes order at ~1.49 µm, or up to the wavelength of zero dispersion (while the fiber still has normal or negative dispersion) and then rapidly blows up into a supercontinuum once the fiber dispersion changes sign and becomes anomalous.

Hence, a method is taught on how to generate supercontinuum in a given wavelength range. For generating supercontinuum, a dispersion zero of the single nonlinear Raman conversion fiber, or the last segment if there are several fiber segments, is placed at or near a certain wavelength $\lambda_x$, longer than the pump laser wavelength. What will result is a cascaded Raman wavelength conversion up to $\lambda_x$ followed by the generation of broad continuous spectrum (supercontinuum) light in a range of wavelengths longer than $\lambda_x$, as illustrated in FIG. 4.

According to the teachings of the present invention, the wavelengths of the intermediate Stokes orders and the output signal 108 are determined by the spectral maximum of Raman gain. Since there are no wavelength-selective reflectors, the only physical mechanism for wavelength selection is the wavelength dependence of gain. The consequence is that output wavelength is uniquely determined by the choice of pump wavelength and the choice of glass for the optical fiber, which will define the Stokes shift (wavelength or optical frequency difference between two nearest Stokes orders). To tune the output wavelength step-wise, the present invention teaches a choice at which Stokes order to stop.

Referring to FIG. 2 by way of example, it is always possible, for a given pump power, to find the length of fiber for which, only specific Stokes order N (up to N=10 in FIG. 2) is the output signal 108. What wavelength that particular Stokes order is, depends on two things—the pump or source wavelength, and the Stokes shift. In the optical frequency domain (in free space f=c/λ, where lambda is the wavelength and c is the speed of light), the shape of the Raman gain, and therefore the Stokes shift Δf that corresponds to a maximum Raman gain for the material fiber core is made of, are always the same, regardless of wavelength. Then, the output optical frequency is $f_{out}=f_{in}-N\times\Delta f$, where $f_{in}$ is the pump or source frequency. So, in this ideal case the output wavelength is defined by the source power, the fiber length and the Stokes shift.

In real-life, due to the pulses from the pulsed light source 102 not being perfectly rectangular, and dispersion related pulse walk-off which is never exactly zero as assumed in the modeling of FIG. 2, what is likely to happen is that at any place in the fiber, not one and perhaps even not two but several Stokes lines will be present at the same time. In other words, if N is the Stokes order desired at the output, it might be discovered that the threshold for (N+1)th order is overcome before the conversion of (N−1)th order to the Nth is completed. In such case, it is desirable to suppress the generation of (N+1)th order by introducing loss at its wavelength. If this is done, then conversion stops at order N and does not cascade further even if the fiber length is increased. All then needed to accomplish the goal of full conversion to order N is to have enough fiber length so that conversion of order N−1 to order N is fully completed.

In most cases, it is better to simply choose the length so that conversion stops at the right order. However, sometimes one might want to have so much output power that it would be difficult to avoid exceeding the threshold for one more order, and it is in this case that a wavelength-dependent loss would help. Thus, the present invention also teaches a possibility to stop the Raman conversion not by choosing the right fiber length but by introducing a strong loss at a particular (N+1) Stokes line, so that conversion ends at number N.

Since the conversion to a particular Stokes order is fully finished before the next one begins, the choice of output wavelength (Stokes order) can be made by simply cutting the conversion fiber at the right length. It is also possible to introduce a distributed (long-wavelength cutoff for the fiber waveguide) or discrete (Bragg grating) spectral filter element at a particular Stokes order wavelength, in which case a conversion can be stopped at the previous Stokes order for any length of fiber.

Referring back to FIG. 1, the full length of the nonlinear Raman conversion fiber 106 or just the last segment if the fiber 106 is segmented can be made to provide the wavelength-selective attenuation for a wavelength band corresponding to a particular (N+1) Stokes order of the source wavelength. Such a wavelength-selective attenuation would provide loss such that the threshold for that particular (N+1) order is never exceeded and cascaded Raman conversion ends at the Stokes order number N. The wavelength-selective attenuation can be due to an incorporation of an absorbing dopant (such as water) in the fiber, an absorption edge of glass material, a long-wavelength cutoff of the fiber waveguide or other physical mechanism for absorbing or attenuating.

Alternatively, a discrete spectrally-selective filter element such as short or long-period fiber Bragg grating or a sharp bend in the fiber can be introduced at the point within a nonlinear Raman conversion fiber 106 where the optical power of the output Stokes order N would otherwise reach the threshold for generation of order (N+1), thereby preventing that from happening.

Figure 5:
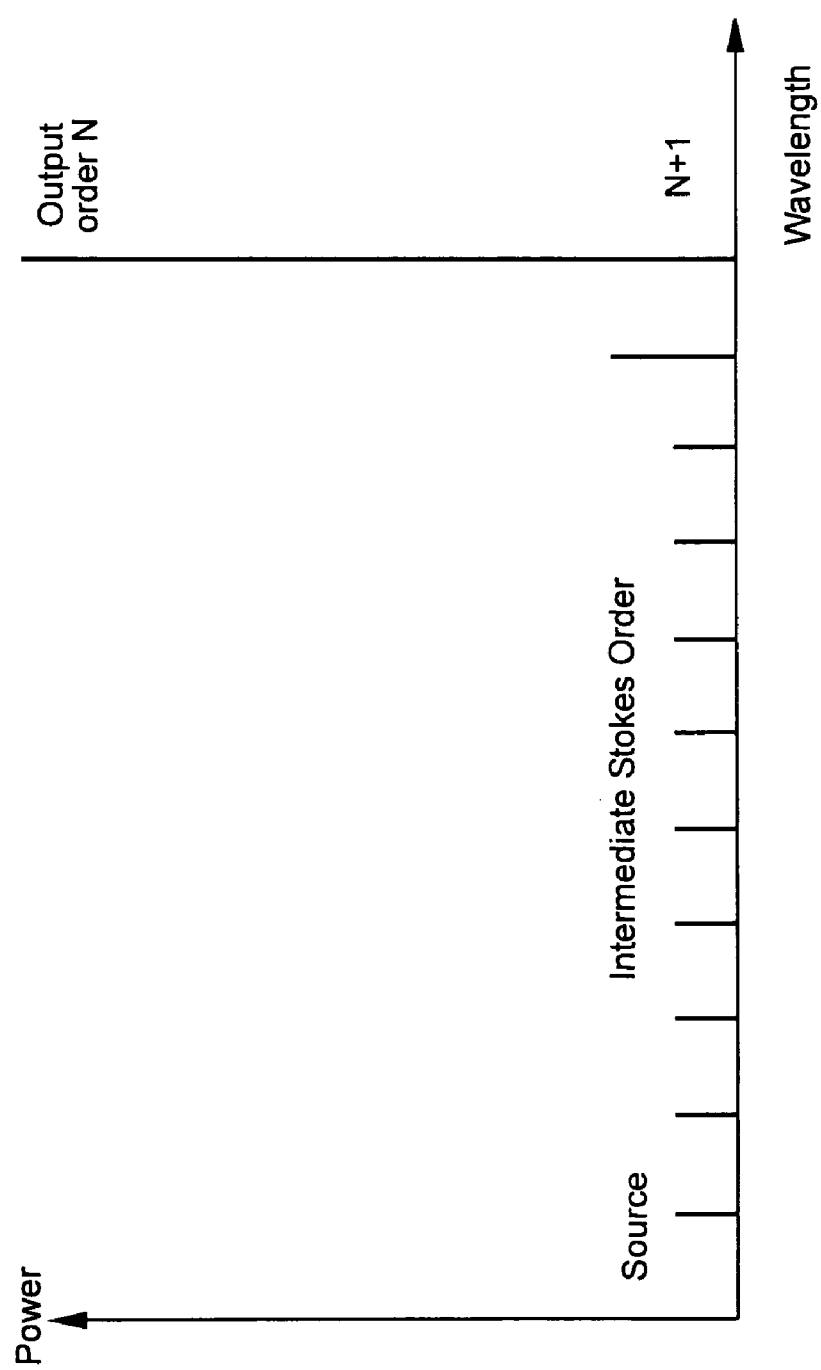
FIG. 5 a spectrum graph of the idealized output of the pulsed cascaded Raman laser 10 of FIG. 1 or FIG. 3, where most of the power is converted to the N-th Stokes order, in accordance with the present invention.

Referring to FIG. 5, a representation of an ideal spectrum for highly efficient Raman conversion is shown, where the (N+1) order is attenuated or does not appear from a proper selection of fiber length. It is to be appreciated that only one, two, or three Stokes orders may appear at the output of fiber 106, and not all N as is shown for simplicity.

It is noted that spectral selector such as a wavelength-dependent fiber coupler can also be used to provide an intermediate output of the selected Stokes order or orders at any point along the fiber length.

Referring back to FIG. 3, an optional seed source 322 is shown. The seed source 322 provides a seed light (having one or multiple wavelengths) for injecting a small amount of a co-propagating CW or pulsed light into the nonlinear Raman conversion fiber 106 via a WDM combiner 324, along with the pulsed light source 102, at one, several or all of the intermediate Stokes and output wavelengths for "seeding" the Raman conversion to increase the Raman conversion efficiency. It is to be appreciated that the seed 322 and the WDM 324 need not be present. Their only role is simply to replace the slow build-up of a corresponding Stokes order from spontaneous emission.

It will be apparent to those skilled in the art that various modifications and variations can be made to the present invention without departing from the spirit and scope of the invention. Thus it is intended that the present invention cover the modifications and variations of this invention provided they come within the scope of the appended claims and their equivalents.

What is claimed is:

1. A pulsed cascaded Raman laser comprising:
    a pulsed light source generating a pulsed light having an optical spectrum centered at a source wavelength; and
    a non-linear Raman conversion fiber coupled to the pulsed light source, said Raman conversion fiber of said pulsed cascaded Raman laser having (i) dispersion D, and $-10$ ps/nm/km<D<$-100$ ps/nm/km, and (ii) fiber length sufficient to overcome N-th Stokes threshold, but not sufficient to overcome (N+1) Stokes threshold resulting in source power converted mostly into N-th order;
    wherein the pulsed light traverses the nonlinear Raman conversion fiber of said pulsed cascaded Raman laser and the source power at the source wavelength is converted to an output power of said pulsed cascaded Raman laser, said output power being centered at an output wavelength longer than the source wavelength by a cascaded Stimulated Raman Scattering process, such that most of the source power is converted to the power output of the last Stokes order in a single pass through the non-linear Raman conversion fiber.

2. The laser of claim 1, wherein the pulsed light source comprises a tunable laser for tuning the source wavelength, wherein the tuning of the source wavelength provides fine tuning of the output wavelength.

3. The laser of claim 1, wherein the non-linear Raman conversion fiber comprises a single nonlinear fiber having a uniform chromatic dispersion throughout the fiber length, such that the chromatic dispersion is normal for the source wavelength, the output wavelength, and every wavelength of a plurality of intermediate Stokes orders.

4. The laser of claim 1, wherein the non-linear Raman conversion fiber comprises a plurality of nonlinear fiber segments connected in series, wherein each fiber segment has a normal chromatic dispersion for a particular subset of the input, output, and intermediate Stokes orders wavelengths that are traversing the particular fiber segment.

5. The laser of claim 1, wherein the non-linear Raman conversion fiber has a chromatic dispersion continuously variable along the fiber length, wherein at any point within the fiber, chromatic dispersion is normal for a particular subset of the input, output, and intermediate Stokes orders wavelengths that are present at this point in the fiber.

6. The laser of claim 1, is coupled to a separate supercontinuum generating fiber for providing a supercontinuum output spectrum, wherein the supercontinuum generating fiber has a dispersion zero at or near the output wavelength of the laser.

7. The laser of claim 6, wherein the nonlinear Raman conversion fiber of the laser has a dispersion zero at or near the output wavelength, such that the portion of the fiber length at the very end serves as a supercontinuum generating fiber.

8. The laser of claim 1, wherein the nonlinear Raman conversion fiber comprises a mechanism for wavelength-selective attenuation of a wavelength band corresponding to a particular (N+1) Stokes order of the source wavelength, providing loss such that the threshold for that particular (N+1) order is never exceeded and cascaded Raman conversion ends at the Stokes order number N.

9. The laser of claim 8, wherein the wavelength-selective attenuation mechanism comprises a member selected from a group consisting of an absorbing dopant in the fiber, an absorption edge of glass material of the fiber, and a long-wavelength cutoff of a fiber waveguide.

10. The laser of claim 8, wherein the wavelength-selective attenuator mechanism comprises a discrete spectrally-selective filter element positioned at a point within the nonlinear Raman conversion fiber where the optical power of the output Stokes order N would otherwise reach the threshold for generation of order (N+1), thereby preventing generation of the order N+1.

11. The laser of claim 1, further comprising a seed pump for injecting a small amount of CW or pulsed light into the nonlinear Raman conversion fiber, co-propagating along with the pulsed light from the pulsed light source, at one, several or all of the intermediate Stokes and output wavelengths for "seeding" the Raman conversion to increase the Raman conversion efficiency.

12. The laser of claim 1, wherein a power conversion efficiency equal to a ratio of the output power at the output wavelength and the source power at the source wavelength is at least fifty percent of a theoretical maximum conversion efficiency equal to the source wavelength divided by the output wavelength.

13. A pulsed cascaded Raman laser comprising:
    a pulsed light source generating a pulsed light having pulses of approximately rectangular shape, the pulses having a peak pulse power and having an optical spectrum centered at a source wavelength; and
    a non-linear Raman conversion fiber coupled to the pulsed light source, the non-linear Raman conversion fiber of said pulsed cascaded Raman laser is manufactured from an optical glass transparent in the mid-infrared wavelength range, the glass made from a member selected from the group consisting of sulfides, selenides, tellurides, germanates (based on $GeO_2$), aluminates (based on $Al_2O_3$), and tellurites (based on $TeO_2$), wherein the pulsed light traverses the nonlinear Raman conversion fiber and the source power at the source wavelength is converted to an output power at an output wavelength in the mid-infrared wavelength range by a cascaded Stimulated Raman Scattering process, the output wavelength longer than the source wavelength, the non-linear Raman conversion fiber having such length and dispersion that most of the source power is converted to the power output of the last Stokes order in a single pass through the non-linear Raman conversion fiber.

* * * * *